_(12)_ United States Patent
Haruta et al.

(10) Patent No.: US 10,287,433 B2
(45) Date of Patent: *May 14, 2019

(54) HEAT-SHRINKABLE POLYESTER FILM AND PACKAGES

(71) Applicant: TOYOBO CO., LTD., Osaka-shi, Osaka (JP)

(72) Inventors: Masayuki Haruta, Tsuruga (JP); Masafumi Inoue, Tsuruga (JP)

(73) Assignee: TOYOBO CO., LTD., Osaka (JP)

( * ) Notice: Subject to any disclaimer, the term of this patent is extended or adjusted under 35 U.S.C. 154(b) by 516 days.

This patent is subject to a terminal disclaimer.

(21) Appl. No.: 14/897,984

(22) PCT Filed: May 20, 2014

(86) PCT No.: PCT/JP2014/063276
§ 371 (c)(1),
(2) Date: Dec. 11, 2015

(87) PCT Pub. No.: WO2014/199787
PCT Pub. Date: Dec. 18, 2014

(65) Prior Publication Data
US 2016/0137833 A1 May 19, 2016

(30) Foreign Application Priority Data

Jun. 11, 2013 (JP) ................................. 2013-123027

(51) Int. Cl.
*B32B 27/36* (2006.01)
*C08G 63/00* (2006.01)
(Continued)

(52) U.S. Cl.
CPC .............. *C08L 67/02* (2013.01); *B29C 55/14* (2013.01); *B29C 61/003* (2013.01); *C08J 5/18* (2013.01);
(Continued)

(58) Field of Classification Search
None
See application file for complete search history.

(56) References Cited

U.S. PATENT DOCUMENTS 4,529,645 A * 7/1985 Berg .......................... C08J 5/18
428/298.7
6,696,146 B1 * 2/2004 Al Ghatta ............... B32B 27/36
428/317.9
(Continued)

FOREIGN PATENT DOCUMENTS

JP 3075019 B2 6/2000
JP 2009-143607 A 7/2009
(Continued)

OTHER PUBLICATIONS

R. Rastogi. "The Three-Phase Structure and Mechanical Properties of Poly(ethylene) terephthalate" Journal of Polymer Science: Part B: Polymer Physics, vol. 42, pp. 2092-2106 (2004).*
(Continued)

*Primary Examiner* — Vivian Chen
(74) *Attorney, Agent, or Firm* — Leydig, Voit & Mayer, Ltd.

(57) ABSTRACT

A heat-shrinkable polyester-based film is provided, which is heat-shrinkable in the longitudinal direction and which is freed from various problems, particularly curling-up or peeling in a bonded area. The heat-shrinkable polyester-based film is characterized by an A1/A2 (absorbance) ratio in the longitudinal direction, which is the main shrinking direction of the film, of 0.55 to 1, with an A1/A2 ratio in the width direction perpendicular to the main shrinking direction of 0.5 to 0.9, wherein A1 is the absorbance of the film at 1340 $cm^{-1}$ and A2 is the absorbance of the film at 1410 $cm^{-1}$ as determined by polarized ATR-FTIR spectroscopy, and a hot-water shrinkage of 35 to 60% in the longitudinal direction of the film and −3 to 12% in the width direction of
(Continued)

the film, wherein the hot-water shrinkage is determined by dipping the film in hot water at 90° C. for 10 seconds.

12 Claims, 1 Drawing Sheet

(51) Int. Cl.

| | |
|---|---|
| C08G 63/12 | (2006.01) |
| C08G 63/123 | (2006.01) |
| C08G 63/127 | (2006.01) |
| C08G 63/137 | (2006.01) |
| C08G 63/16 | (2006.01) |
| C08G 63/18 | (2006.01) |
| C08G 63/181 | (2006.01) |
| C08G 63/199 | (2006.01) |
| B65D 53/06 | (2006.01) |
| B65D 75/00 | (2006.01) |
| B65D 75/04 | (2006.01) |
| B65D 75/58 | (2006.01) |
| C08L 67/02 | (2006.01) |
| C08L 67/03 | (2006.01) |
| B29C 55/14 | (2006.01) |
| C08J 5/18 | (2006.01) |
| B29C 61/00 | (2006.01) |
| G09F 3/02 | (2006.01) |
| G09F 3/04 | (2006.01) |
| B29K 105/02 | (2006.01) |
| B29K 67/00 | (2006.01) |

(52) U.S. Cl.
CPC .................. *G09F 3/02* (2013.01); *G09F 3/04* (2013.01); *B29K 2067/00* (2013.01); *B29K 2105/02* (2013.01); *B32B 27/36* (2013.01); *B32B 2307/518* (2013.01); *B32B 2307/54* (2013.01); *B32B 2307/582* (2013.01); *B32B 2307/5825* (2013.01); *B32B 2307/736* (2013.01); *B65D 53/06* (2013.01); *B65D 75/00* (2013.01); *B65D 75/002* (2013.01); *B65D 75/04* (2013.01); *B65D 75/58* (2013.01); *C08G 63/00* (2013.01); *C08G 63/12* (2013.01); *C08G 63/123* (2013.01); *C08G 63/127* (2013.01); *C08G 63/137* (2013.01); *C08G 63/16* (2013.01); *C08G 63/18* (2013.01); *C08G 63/181* (2013.01); *C08G 63/199* (2013.01); *C08J 2367/02* (2013.01); *C08J 2467/02* (2013.01); *C08L 67/03* (2013.01); *G09F 2003/0272* (2013.01); *Y10T 428/1328* (2015.01); *Y10T 428/1331* (2015.01); *Y10T 428/31786* (2015.04)

(56) References Cited

U.S. PATENT DOCUMENTS

| | | | |
|---|---|---|---|
| 9,017,782 B2* | 4/2015 | Haruta | B29C 61/003 |
| | | | 428/192 |
| 9,944,012 B2* | 4/2018 | Haruta | B29C 55/08 |
| 2008/0182053 A1* | 7/2008 | Broadus | B32B 27/34 |
| | | | 428/34.9 |
| 2009/0270584 A1* | 10/2009 | Endo | B29C 55/146 |
| | | | 528/308.1 |
| 2010/0256309 A1 | 10/2010 | Endo et al. | |
| 2012/0043248 A1* | 2/2012 | Haruta | B29C 55/065 |
| | | | 206/497 |
| 2013/0008821 A1* | 1/2013 | Haruta | C08J 5/18 |
| | | | 206/459.5 |
| 2015/0014202 A1* | 1/2015 | Haruta | B29C 61/003 |
| | | | 206/459.5 |
| 2016/0090456 A1* | 3/2016 | Ishimaru | C08J 5/18 |
| | | | 428/131 |
| 2018/0079877 A1* | 3/2018 | Ishimaru | C08J 5/18 |

FOREIGN PATENT DOCUMENTS

| | | |
|---|---|---|
| JP | 4411556 B2 | 11/2009 |
| JP | 2010-247370 A * | 11/2010 |
| JP | 4752360 B2 | 6/2011 |
| JP | 2011-252129 A * | 12/2011 |
| JP | 5151015 B2 | 12/2012 |
| JP | 5240387 B * | 7/2013 |
| WO | WO 2009/075333 A1 | 6/2009 |
| WO | WO 2010-119751 A * | 10/2010 |
| WO | WO 2010/137240 A1 | 12/2010 |
| WO | WO 2011/114934 A1 | 9/2011 |
| WO | WO 2014/017483 A * | 1/2014 |

OTHER PUBLICATIONS

European Patent Office, Communication Pursuant to Article 94(3) EPC in European Patent Application No. 14 810 446.6 (dated Jun. 3, 2016).
Hummel et al., *Atlas of Polymer and Plastic Analysis*, Chapter 6: "Description of the substance classes and their IR spectra: Defined natural and synthetic polymers," Section 6.3: "Polymers containing 3 elements," pp. 370-371 (Vch verlagsgesellschaft mbh, $3^{rd}$ edition,1991).
Uenomachi, Kiyomi, "Control of Shrinkage Property of Heat-Shrinkable Polyester Film," *Seikei-Kakou*, 6(10): 679-682 (1994).
Japanese Patent Office, International Search Report in International Patent Application PCT/JP2014/063276 (dated Aug. 19, 2014).
Chinese Patent Office, Notification of First Office Action in Chinese Patent Application No. 201480033599.7 (dated Sep. 6, 2016).
European Patent Office, Communication Pursuant to Article 94(3) EPC in European Patent Application No. 13822644.4 (dated Dec. 23, 2014).
Korean Patent Office, Notice of Preliminary Rejection in Korean Patent Application No. 10-2014-7019244 (dated Nov. 27, 2015).
Japanese Patent Office, 1st Office Action in Japanese Patent Application No. 2012-166345 (dated Nov. 13, 2013).
Japanese Patent Office, International Search Report in International Patent Application No. PCT/JP2013/069908 (dated Oct. 29, 2013).

* cited by examiner

HEAT-SHRINKABLE POLYESTER FILM AND PACKAGES

CROSS-REFERENCE TO RELATED APPLICATIONS

This patent application is the U.S. national phase of International Patent Application No. PCT/JP2014/063276, filed May 20, 2014, which claims the benefit of Japanese Patent Application No. 2013-123027, filed on Jun. 11, 2013, which are incorporated by reference in their entireties herein.

TECHNICAL FIELD

The present invention relates to a heat-shrinkable polyester film and a package suitable label applications.

BACKGROUND ART

Recently, in applications such as label package doubling as a protection of a glass bottle and a PET bottle etc. and display of articles, cap sealing and accumulation package, there have been widely used drawn films (so-called heat-shrinkable films) composed of a polyvinyl chloride resin, a polystyrene resin, a polyethylene resin or the like. Of these heat-shrinkable films, a polyvinyl chloride film has problems that heat resistance is low, and it generates hydrogen chloride gas in incineration and causes dioxin. A polystyrene film has problems that it is inferior in chemical resistance, as well as an ink with a special composition needs to be used in printing, it requires high temperature incineration and generates a lot of black smoke accompanied by an abnormal odor. Therefore, as a shrink label, there has been widely used a polyester heat-shrinkable film which is high in heat resistance, easy to incinerate, and excellent in solvent resistance, and the use amount tends to increase being accompanied by an increase in turn volume of PET containers.

As a heat-shrinkable polyester film, one which is allowed to shrink greatly in the width direction has been widely utilized up to the present time. Although the heat-shrinkable polyester film in which the width direction is the main shrinking direction is subjected to drawing at a high ratio in the width direction in order to allow the shrinkage properties in the width direction to be developed, with regard to the longitudinal direction orthogonal to the main shrinking direction, there have been many cases in which the film is only subjected to drawing at a low ratio and there is also a case in which the film is not subjected to drawing. The film subjected to drawing at a low ratio in the longitudinal direction and the film subjected to drawing only in the width direction have a drawback that the mechanical strength in the longitudinal direction is poor.

Moreover, in the case of preparing a label for a bottle for beverage from a heat-shrinkable film, it is necessary that the film be formed into a tube shape to be mounted to a bottle and then be allowed to shrink by heat in the peripheral direction of the bottle. On that account, in the case of forming a heat-shrinkable film which is heat-shrinkable in the width direction into a label, while a tube body is formed so as to allow the width direction of the film to become the peripheral direction, this tube body must be cut into a label with a prescribed length to be mounted to a bottle. Accordingly, there has been a restriction on the speed for mounting a label composed of a heat-shrinkable film which is heat-shrinkable in the width direction to a bottle, and improvement thereof has been desired.

On that account, recently, a film which is capable of being wound around a bottle directly from a film roll to be formed into a label (the so-called wrap-around) and is heat-shrinkable in the longitudinal direction has been desired. Furthermore, in recent years, a wrapping method of covering the circumference of a synthetic resin-made container for a box lunch or the like with a belt-shaped film to hold the container in a closed state has been developed, and the film which is shrinkable in the longitudinal direction is suitable for such a packaging application. Accordingly, the demand for the film which is shrinkable in the longitudinal direction is expected to dramatically increase in the future.

It is known for a long time that, at the time of producing a label from a film which is shrinkable in the width direction, bonding is performed using an organic solvent (Patent Document 1 and the like). In contrast, with regard to a film which is heat-shrinkable in the longitudinal direction, a method of allowing an end part of the film to adhere by means of heat sealing, a hot-melt adhesive, or the like while allowing the film to be wound around a bottle has been employed. However, when the speed of a label mounting line is highly quickened for enhancing the productivity, sufficient adhesive strength is not attained, and a problem that being turned up or peeling occurs in a bonded part at the time of heat shrinkage has been generated.

Furthermore, with regard to films which are shrinkable in the longitudinal direction (Patent Documents 2 to 4), when the heat shrinkage in the longitudinal direction is attempted to be heightened, the maximum shrinkage stress is also heightened and being turned up or peeling occurs in a bonded part of a label at the time of shrinkage. That is, these problems have been generated because the heat shrinkage in the longitudinal direction and the maximum shrinkage stress correlate with each other.

On the other hand, the present applicant has consistently continued the development of a heat-shrinkable polyester film and has published a number of techniques. However, as the amount of consumption of PET bottles has been expanding in recent years, the production at a faster rate has been desired, and a heat-shrinkable polyester film more excellent in shrinkage finishing properties has been desired.

PRIOR ART DOCUMENT

Patent Document

Patent document 1: JP-B No. 3075019
Patent document 2: JP-B No. 4411556
Patent document 3: JP-B No. 4752360
Patent document 4: JP-B No. 5151015

SUMMARY OF THE INVENTION

Problems to be Solved by the Invention

An object of the present invention as a problem to be solved is to provide a heat-shrinkable polyester film which is heat-shrinkable in the longitudinal direction, is freed from the above various problems, particularly the problem that being turned up or peeling occurs in a bonded part, and thus exhibits excellent shrinkage finishing properties.

Means for Solving to the Problems

The gist of the present invention which solves the above-mentioned problems is found in a heat-shrinkable polyester film in which the main shrinking direction is the longitudinal direction, wherein a ratio A1/A2 (absorbancy ratio) of an absorbancy A1 of the film at 1340 cm$^{-1}$ obtained when measured by a polarized ATR-FTIR method to an absorbancy A2 thereof at 1410 cm$^{-1}$ obtained when measured by a polarized ATR-FTIR method is not less than 0.55 and not more than 1 in the longitudinal direction which is the main shrinking direction of the film while the ratio A1/A2 is not less than 0.5 and not more than 0.9 in the width direction orthogonal to the main shrinking direction, and the hot-water shrinkage obtained by dipping in hot water at 90° C. for 10 seconds is not less than 35% and not more than 60% in the longitudinal direction of the film while the hot-water shrinkage is not less than −3% and not more than 12% in the width direction thereof.

The heat-shrinkable polyester film, wherein the maximum shrinkage stress in the main shrinking direction of the film determined when measured with hot air at 90° C. is preferably not less than 3 MPa and less than 7 MPa, and the shrinkage stress at the end of 30 seconds after the initiation of measurement is preferably not less than 70% and not more than 100% of the maximum shrinkage stress.

The heat-shrinkable polyester film, wherein the absolute value $|\Delta_{90-80}-\Delta_{80-70}|$ of the difference between a difference $\Delta_{90-80}$ between a hot-water shrinkage at 90° C. and a hot-water shrinkage at 80° C. and a difference $\Delta_{80-70}$ between a hot-water shrinkage at 80° C. and a hot-water shrinkage at 70° C. is preferably not more than 5% when the film is dipped in hot water at each of the temperatures of 90° C., 80° C. and 70° C. for 10 seconds and the hot-water shrinkage in the longitudinal direction is measured.

The heat-shrinkable polyester film has preferably the tensile breaking strength in the width direction of the film of not less than 90 MPa and not more than 220 MPa, the right-angled tearing strength per unit thickness in the width direction determined after shrunk by 10% in the longitudinal direction in hot water at 80° C. of not less than 150 N/mm and not more than 300 N/mm as the preferred embodiments.

The heat-shrinkable polyester film, wherein a main component of a monomer capable of forming an amorphous component in the whole polyester resin component is composed neopentyl glycol, 1,4-cyclohexanedimethanol or isophthalic acid.

The present invention comprises a package, comprising: a label prepared from the heat-shrinkable polyester film and provided with a perforation or a notch, wherein the label is formed by being allowed to cover at least a part of the outer periphery of an object to be packaged and then to shrink by heat.

Effects of the Invention

Since the heat-shrinkable polyester film of the present invention features that the shrinkage gently increases in the longitudinal direction which is the main shrinking direction with a rise in temperature (the shrinkage speed is low) and the mechanical strength in the width direction orthogonal to the longitudinal direction is high, the film can be very efficiently mounted within a short time to a container such as a bottle when used as a label for a PET bottle or the like, and the satisfactory finish with extremely reduced wrinkles and insufficient shrinkage can be developed when allowed to shrink by heat. Moreover, since the shrinkage stress is small, it is possible to suppress a bonded part from being turned up or peeling when a tube body thereof is mounted to a bottle and then allowed to shrink by heat.

In addition, the perforation opening property which the label has is satisfactory, and it is possible to beautifully cut the film along the perforation from the beginning of tearing up to the completion of the tearing at the time of opening the label.

Moreover, since the heat-shrinkable polyester film according to the present invention is a film produced by being biaxially drawn lengthwisely and transversely, the film can be very efficiently produced. Moreover, with regard to the heat-shrinkable polyester film of the present invention, the adhesive force at the time of allowing front and back surfaces (or two front or back surfaces) to be bonded together by a solvent is extremely high, and the film can be suitably used for various cover labels and the like including a label for a PET bottle and the like.

And then, a package packaged with a label obtained from the heat-shrinkable polyester film of the present invention has a beautiful appearance.

MODE FOR CARRYING OUT THE INVENTION

The polyester used in the present invention is a polyester whose main constituent is ethylene terephthalate. Namely, it contains 50% by mole or more, preferably 60% by mole or more of ethylene terephthalate. Dicarboxylic acid components constituent the polyester of the present invention can include aromatic dicarboxylic acids such as isophthalic acid, naphthalenedicarboxylic acid and ortho-phthalic acid; aliphatic dicarboxylic acids such as adipic acid, azelaic acid, sebacic acid and decanedicarboxylic acid; and alicyclic dicarboxylic acid.

In the case of containing the aliphatic dicarboxylic acids (for example, adipic acid, sebacic acid and decanedicarboxylic acid etc.), the content is preferably less than 3% by mole. A heat-shrinkable polyester film obtained by using a polyester that contains 3% by mole or more of these aliphatic dicarboxylic acids is insufficient in film stiffness at high-speed attachment.

Further, it is preferable not to contain polybasic carboxylic acids of tribasic or more (for example, trimellitic acid, pyromellitic acid and anhydride thereof etc.). A heat-shrinkable polyester film obtained by using a polyester containing these polybasic carboxylic acids is hard to achieve a necessary high shrinkage.

Diol components constitute the polyester include aliphatic diols such as ethylene glycol, 1,3-propanediol, 1,4-butanediol, neopentyl glycol and hexanediol; alicyclic diols such as 1,4-cyclohexanedimethanol; and aromatic diols such as bisphenol A.

The polyester used in the present invention is preferably a polyester containing one kind or more of cyclic diols such as 1,4-cyclohexanedimethanol and diols having carbon 3 to 6 carbon atoms (for example, 1,3-propanediol, 1,4-butanediol, neopentyl glycol and hexanediol etc.) and adjusting a glass transition point (Tg) in 60 to 80° C.

Further, the polyester used for the heat-shrinkable polyester film of the present invention preferably has 15% by mole or more of the sum of at least one monomer capable of forming an amorphous component in 100% by mole of the polyhydric alcohol component or in 100% by mole of the polybasic carboxylic acid component in the whole polyester resin, more preferably 16% by mole or more, further more preferably 17% by mole or more, and particularly preferably 18% by mole or more. The upper limit of sum of monomer capable of forming an amorphous component, is not limited, is preferably 30% by mole or less.

As a monomer capable of forming an amorphous component, for example, there can be listed neopentyl glycol, 1,4-cyclohexanedimethanol, isophthalic acid, 1,4-cyclohexanedicarboxylic acid, 2,6-naphthalenedicarboxylic acid, 2,2-diethyl-1,3-propanediol, 2-n-butyl-2-ethyl-1,3-propanediol, 2,2-isopropyl-1,3-propanediol, 2,2-di-n-butyl-1,3-propanediol, 1,4-butanediol and hexanediol, and among these, neopentyl glycol, 1,4-cyclohexanedimethanol or isophthalic acid is preferably used.

Using ε-caprolactone is preferable. The ε-caprolactone (ε-CL) is counted as a polyhydric alcohol.

In a polyester, it is preferable not to contain diols having 8 or more carbon atoms (for example, octanediol etc.) or polyhydric alcohols of trihydric or more (for example, trimethylolpropane, trimethylolethane, glycerin, diglycerin etc.). A heat-shrinkable polyester film obtained by using polyester containing these diols or polyhydric alcohols is hard to achieve a necessary high shrinkage. Further, in the polyester used in the heat-shrinkable polyester film of the present invention, it is preferable not to contain diethylene glycol, triethylene glycol and polyethylene glycol as far as possible.

To a resin for forming the heat-shrinkable polyester film of the present invention, according to needs, there can be added various additives, such as waxes, an antioxidant, an antistatic agent, a crystal-nucleation agent, a viscosity reducing agent, a heat stabilizer, a pigment for coloring, a color protection agent, and an ultraviolet absorber.

By adding fine particles as lubricant to a resin for forming the heat-shrinkable polyester film of the present invention, it is preferable to make workability (slipperiness) of the film better. The fine particles can be arbitrarily selected, for example, as inorganic fine particles, silica, alumina, titanium dioxide, calcium carbonate, kaolin, barium sulfate and the like can be listed. As organic fine particles, for example, an acrylic resin particle, a melamine resin particle, a silicone resin particle, a crosslinked polystyrene particle and the like can be listed. The average particle diameter of the fine particles is in a range of 0.05 to 3.0 μm (when measured by coulter counter), and it can be suitably selected according to need.

As a method for compounding the above-described particles in a resin for forming the heat-shrinkable polyester film, for example, they can be added in an arbitrary step in production of the polyester resin, but they are preferably added in a step of esterification, or in a step before start of polycondensation reaction after completion of ester exchange reaction as slurry dispersed in ethylene glycol etc., followed by carrying out polycondensation reaction. Further, it is also preferably carried out by a method in which slurry of particles dispersed in ethylene glycol, water or the like and raw materials of polyester resin are mixed using a kneading extruder with a vent, or a method in which dried particles and raw materials of polyester resin are mixed using a kneading extruder.

It is also possible to conduct corona treatment, coating treatment, frame treatment etc. on the heat-shrinkable polyester film of the present invention in order to enhance adhesiveness of film surface.

Then, the properties necessary for the heat-shrinkable film of the present invention is described. With regard to the heat-shrinkable polyester film according to the present invention, the ratio A1/A2 of an absorbancy A1 at 1340 cm-1 to A2 at 1410 cm-1 obtained when measured by a polarized ATR-FTIR method (hereinafter, the absorbancy ratio) needs to be not less than 0.55 and not more than 1 in the main shrinkage direction (hereinafter, the longitudinal direction) of the film and not less than 0.5 and not more than 0.9 in the direction orthogonal to the main shrinkage direction (hereinafter, the width direction).

The absorbancy ratio represents the trans conformation ratio of the molecular orientation. It has hitherto been considered that the amorphous orientation related to the shrinkage is affected by the gauche conformation ratio. However, in an article by Kiyomi UENOMACHI, ("Shrinkage property control of heat-shrinkable polyester film", Seikeikakou, Vol. 6, No. 10, (1994), p. 679-682), there is almost no change in the gauche conformation ratio even when the film-forming conditions are modified to change the shrinkage, and a ratio which is changed by the modification of film-forming conditions is the trans conformation ratio.

Further, the present inventors have obtained experimental results that the change in trans conformation ratio is related to the shrinkage by allowing the drawing temperature and the like to be modified. Accordingly, it is considered that a ratio which represents the molecular orientation related to the heat shrinkage is the trans conformation ratio. It is considered that the trans conformation represents the state of oriented molecular chains, and when the trans conformation ratio is high, the degree of orientation of molecular chains is also high. In the above article, it is considered that the ease of shrinkage varies with the difference of the structure of the molecular chain (the length of the rotational isomer) in the case where polyester prepared with amorphous monomers is used as a raw material. Therefore, when the orientation of molecular chains easy to shrink is high in a film production process, by applying sufficient heat to relax the stress applied to the molecular chains (=shrink the molecular chains), the stress applied to the molecular chains is relaxed and is reduced (the change in molecular chains becomes large), and it is considered that the shrinkage is also increased.

The heat-shrinkable film described in the article is a uniaxially drawn film drawn only in the width direction which is the main shrinkage direction, and is not a film that satisfies various properties required for the heat-shrinkable polyester film. As such, the present inventors have focused their attention on the molecular orientation (the trans conformation ratio) in a film drawn in two axial directions of the longitudinal direction (MD direction) and the width direction (TD direction), and have conducted studies on the trans conformation ratio of the longitudinal direction and the width direction in order to ascertain what kind of molecular orientation is the molecular orientation exhibiting suitable heat shrinkage properties. Thus the present invention has been completed.

Moreover, in the above article, the absorbancy ratio of the trans conformation is determined from a ratio of 795 cm$^{-1}$ and 975 cm$^{-1}$. However, there are also several other absorbancies that can be employed for measuring the trans conformation ratio. In the present invention, as a result of determining a trans conformation index from a plurality of absorbancy ratios with reference to the document {Atlas of polymer and plastic analysis: Vch verlagsgesellschaft mbh, 370 (1991)}, since the absorbancy ratio of 1340 cm$^{-1}$ and 1410 cm$^{-1}$ has the greatest difference between values, the trans conformation ratio is determined from this absorbancy ratio. That is, in the present invention, this absorbancy ratio is defined as the trans conformation ratio.

In the present invention, the absorbancy ratio needs to fall within the range of 0.55 to in the longitudinal direction of the film. When the absorbancy ratio in the width direction of the film is less than 0.55, the shrinkage at 90° C. is small since the molecular orientation is low. The absorbancy ratio is preferably not less than 0.57, and more preferably not less than 0.59. In contrast, since the molecular orientation becomes too high when the absorbancy ratio in the longitudinal direction of the film is more than 1, the shrinkage speed becomes fast (does not gently shrink) and wrinkles and strains are easily generated on the label after shrinkage. The absorbancy ratio in the longitudinal direction is preferably not more than 0.98, and more preferably not more than 0.96.

On the other hand, in the case where the absorbancy ratio needs to fall within the range of 0.5 to 0.9 in the width direction. When the absorbancy ratio in the width direction of the film is less than 0.5, the tensile breaking strength of the width direction is small and the right-angled tearing strength is large. Further, because the shrinkage speed becomes fast, wrinkles and strains are easily generated on the label after shrinkage. The absorbancy ratio in the width direction is preferably not less than 0.53, and more preferably not less than 0.55. Moreover, since the molecular orientation becomes high when the absorbancy ratio in the width direction of the film is higher than 0.9, it is preferred in the point that the tensile breaking strength in the width direction is also increased, but the hot-water shrinkage at 90° C. in the width direction of the film also becomes too high. As a result, wrinkles and strains are easily generated on the label after shrinkage. The absorbancy ratio in the width direction is preferably not more than 0.87, and more preferably not more than 0.84.

In the present invention, as described later, a film is drawn in the width direction thereof, after which the film is drawn in the longitudinal direction thereof. In general, a conventional heat-shrinkable film is a uniaxially drawn film drawn in the width direction, and in such a uniaxially drawn film, the strength in the undrawn direction is insufficient since only the orientation in the drawing direction, namely, the trans conformation ratio (absorbancy ratio) in the width direction, is high. In the present invention, since the film is drawn in the width direction and longitudinal direction, values of trans conformation ratios in both directions are close to each other, and a film excellent in the balance of the strength is attained.

The difference between the absorbancy ratio in the longitudinal direction of the film and the absorbancy ratio in the width direction of the film is preferably not more than 0.13. Usually, with regard to the film drawn in two axial directions, when the draw ratios at the first drawing and second drawing are close to each other, it is common that the orientation in the width direction which is the final drawing direction is high. However, in the present invention, the film is characterized in that the difference in orientation between the longitudinal direction and the width direction is small. The reason why the orientation in the final drawing direction of a common biaxially drawn film is high is that the drawing stress in a direction at the second drawing is higher than the drawing stress at the first drawing.

In the present invention, by controlling the drawing condition as described below, the drawing stress in a drawing direction at the second drawing is not made significantly higher than the drawing stress at the first drawing. As a result, the drawing stress at the second drawing becomes small, and it is presumed that the difference between the degrees of orientation (absorbancy ratios) in the width direction and longitudinal direction becomes a small value of not more than 0.13. And then, it is considered that being small in this difference between the degrees of orientation (absorbancy ratios) in the width direction and longitudinal direction serves as an index for indicating how the molecular chains of polyesters in the present invention are drawn out, namely, whether the molecular chains are drawn in both of the width direction and longitudinal direction. The difference between the absorbancy ratios in the width direction and longitudinal direction is more preferably not more than 0.12 and is further preferably not more than 0.1.

With regard to the heat-shrinkable polyester film of the present invention, the heat shrinkage in the longitudinal direction (the main shrinkage direction) of the film which is calculated from the lengths before and after shrinkage obtained by dipping the film in a no-load state in hot water of 90° C. for 10 seconds and immediately dipping the film in water of 25° C.±0.5° C. for 10 seconds according to the Equation 1 is not less than 35% and not more than 60%.

$$\text{Heat shrinkage} = \{(\text{length before shrinkage} - \text{length after shrinkage})/\text{length before shrinkage}\} \times 100 \, (\%) \quad \text{Equation 1}$$

In order to prevent such a situation that the shrinkage amount is small and wrinkles and slack are generated on a label after heat shrinkage in the case of being used as the label, the hot-water shrinkage in the longitudinal direction at 90° C. is preferably not less than 35%, more preferably not less than 38% and further preferably not less than 41%. In contrast, in order to prevent such a situation that the film cannot gently shrink and strains are generated on a label after shrinkage, the hot-water shrinkage in the longitudinal direction at 90° C. is preferably not more than 60%, more preferably not more than 57% and further preferably not more than 54%.

Moreover, with regard to the heat-shrinkable polyester film according to the present invention, the hot-water shrinkage at 90° C. in the width direction (the direction orthogonal to the main shrinking direction) of the film obtained when measured in the same manner as above is preferably not less than −3% and not more than 12%. When the hot-water shrinkage in the width direction at 90° C. is less than −3% (that is, allowed to largely extend by heating), it is not preferred because at the time of being used as a label for a bottle, the label is allowed to extend, wrinkles are easily generated and a satisfactory shrinkage appearance cannot be attained. Conversely, when the hot-water shrinkage in the width direction at 90° C. is more than 12%, it is not preferred because strains are easily generated on the label after shrinkage. A more preferred the hot-water shrinkage at 90° C. in the width direction is not less than −2% and not more than 10%, and further preferably not less than −1% and not more than 8%.

With regard to the heat-shrinkable polyester film according to the present invention, the shrinkage stress in the longitudinal direction measured in hot air of 90° C. is preferably not less than 3 MPa and less than 7 MPa, and the shrinkage stress after 30 seconds from the initiation of measurement is preferably not less than 70% and not more than 100% relative to the maximum shrinkage stress. In this connection, the measurement for the shrinkage stress is performed by a method described in Examples.

When the maximum shrinkage stress at 90° C. in the longitudinal direction of the film is less than 3 MPa, it is not preferred because at the time of being used as a label for a bottle, the label is slackened and may not be closely brought into contact with the bottle. The maximum shrinkage stress at 90° C. is more preferably not less than 3.3 MPa and further preferably not less than 3.6 MPa. Conversely, when the maximum shrinkage stress at 90° C. is not less than 7 MPa, it is not preferred because being turned up or peeling occurs easily in a bonded area of a label at the time of shrinkage. The maximum shrinkage stress at 90° C. is more preferably not more than 6.5 MPa and further preferably not more than 6 MPa.

The shrinkage stress at 90° C. in the longitudinal direction of the film after 30 seconds from the initiation of measurement is preferably not less than 70% and not more than 100% relative to the above maximum shrinkage stress. That is, the heat-shrinkable polyester film of the present invention features specific heat shrinkage properties such that the shrinkage stress almost comparable to the maximum heat shrinkage stress is developed even at the end of 30 seconds after the film begins to shrink by heat. In order to prevent such a situation that at the time of covering a bottle with a label and shrinking the label by heating, the followability of the label becomes poor in the case where the bottle is allowed to expand by heating and the label is slackened when the temperature of the bottle is lowered after shrinkage and then the heat expansion is eliminated, the shrinkage stress after 30 seconds/maximum shrinkage stress (hereinafter, the stress ratio) of the heat-shrinkable polyester film is preferably not less than 70%. The stress ratio is more preferably not less than 75%, and further preferably not less than 80%. Although a higher stress ratio is preferred because the followability is more improved, it is improbable that the shrinkage stress at the end of 30 seconds exceeds the maximum shrinkage stress, and therefore the upper limit thereof is 100%.

When the heat-shrinkable polyester film according to the present invention is dipped in hot water at each of the temperatures of 90° C., 80° C. and 70° C. for 10 seconds and the hot-water shrinkage in the main shrinking direction is measured, it is preferred that the absolute value $|\Delta_{90\text{-}80}-\Delta_{80\text{-}70}|$ of the difference between a difference $\Delta_{90\text{-}80}$ between a hot-water shrinkage at 90° C. and a hot-water shrinkage at 80° C. and a difference $\Delta_{80\text{-}70}$ between a hot-water shrinkage at 80° C. and a hot-water shrinkage at 70° C. be not more than 5%.

The smaller the value of $|\Delta_{90\text{-}80}-\Delta_{80\text{-}70}|$ is, the more the shrinkage is allowed to gently increase with a rise in temperature (the lower the shrinkage speed is). The value of $|\Delta_{90\text{-}80}-\Delta_{80\text{-}70}|$ is more preferably not more than 4% and further preferably not more than 3%. In this connection, the lower limit of the difference between shrinkages is 0%.

In the heat-shrinkable polyester film of the present invention, when right-angled tearing strength per unit thickness in the width direction after being shrunk by 10% in the longitudinal direction in hot water at 80° C., the right-angled tearing strength per unit thickness in the width direction is preferable 150 N/mm or more and 300 N/mm or less. The measurement for the right-angled tearing strength is performed by a method described in Examples.

When the right-angled tearing strength is less than 150 N/mm, a situation in which the film is easily torn by an impact such as falling during transportation is possibly caused when the film is used as a label, whereby the case is not preferred. In order to prevent from coming to have poor cutting property (easiness of tearing) at an early stage of tearing a label, the right-angled tearing strength is preferably 300 N/mm or less. The right-angled tearing strength is more preferably 155 N/mm or more, further preferably 160 N/mm or more, particularly preferably 165 N/mm or more, and most preferably 170 N/mm or more. The right-angled tearing strength is more preferably 290 N/mm or less, further preferably 280 N/mm or less, particularly preferably 270 N/mm or less.

With regard to the heat-shrinkable polyester film according to the present invention, it is preferred that the tensile breaking strength in the width direction be not less than 90 MPa and not more than 220 MPa. In this connection, the measurement method for the tensile breaking strength will be described in Examples. When the tensile breaking strength is less than 90 MPa, it is not preferred because at the time of being mounted to a bottle or the like as a label, the "stiffness" thereof becomes weak. Conversely, when the tensile breaking strength is more than 220 MPa, it is not preferred because the cutting property (easiness of tearing) becomes poor at an early stage of tearing a label. The tensile breaking strength is preferably 100 MPa or more, more preferably 110 MPa or more, and particularly preferably 120 MPa or more. The tensile breaking strength is preferably 210 MPa or less, more preferably 200 MPa or less, particularly preferably 190 MPa or less.

The thickness of the heat-shrinkable polyester film of the present invention is not particularly limited, but 10 μm or more and 70 μm or less is preferable, and has a haze value of 2% or more and 13% or less. When the haze value exceeds 13%, it is not preferable because transparency becomes bad, so that there is a probability that appearance becomes bad in a label production. Additionally, the haze value is more preferably 11% or less, and particularly preferably 9% or less. Further, the smaller the haze value, the better, but the lower limit is about 2% from considerations that a predetermined amount of a lubricant may be added to the film in order to provide slipperiness necessary for practical use or the like.

In a method for producing the heat-shrinkable polyester film of the present invention, the foregoing polyester raw material is melt-extruded by an extruder to form an undrawn film, and the undrawn film is biaxially drawn by a predetermined method shown below and heat-treated. In this connection, polyester can be obtained by allowing the suitable dicarboxylic acid component and diol component mentioned above to undergo a polycondensation by a known method. Moreover, usually, two or more kinds of chip-like polyesters are mixed to be used as raw materials.

When a raw material is melt-extruded, it is preferable to dry the polyester raw material using a dryer such as a hopper dryer and a paddle dryer, or a vacuum dryer. After the polyester raw material is dried in such a manner, utilizing an extruder, it is melted at a temperature of 200 to 300° C., and extruded into a film form. In such an extrusion, an arbitrary conventional method such as a T-die method and a tubular method can be adopted.

Then, the sheet-like molten resin after extrusion is quenched to be able to obtain an undrawn film. As a method for quenching the molten resin, a method in which a molten resin is cast on a rotary drum from a die and solidified by quenching to obtain a substantially unoriented resin sheet can be suitably adopted.

The undrawn film obtained is drawn in the width direction under a predetermined condition as described below, and the film after transverse drawing is subjecting a heat treatment and quenching, and then drawn in the longitudinal direction under a predetermined condition, and is subjecting a heat treatment once again, thereby obtaining a heat-shrinkable polyester film of the present invention. Hereinafter, a preferable film forming method to obtain a heat-shrinkable polyester film of the present invention is described in detail by considering the difference from the film forming method of the conventional heat-shrinkable polyester film.

[Method for Producing the Heat-Shrinkable Polyester Film]

As described above, generally, a heat-shrinkable polyester film can be produced by drawing an undrawn film only in a direction to be shrunk (namely, main shrinkage direction, in the present invention longitudinal direction). The present inventors have studied on the conventional production method, and as a result, it has been found that there are the following problems in production of the conventional heat-shrinkable polyester film.

- In the case of simply drawing in the longitudinal direction, as described above, mechanical strength in the width direction becomes small, perforation-tear property as a label become bad. In addition, it is difficult to widen a product gathering width and to increase a line speed of a film forming equipment.
- Moreover, in the case of simply drawing in the longitudinal direction, as described above, it follows that the shrinkage stress in the longitudinal direction and the shrinkage speed conflict with each other, and the finishing properties at the time of allowing the film as a label for a bottle for beverage or the like to shrink and the slack (followability) of the label with which a bottle is covered after allowed to shrink are insufficient.
- In the case of adopting a method of drawing in the width direction after drawing in the longitudinal direction, using any drawing condition cannot sufficiently exhibit shrinkage force in the longitudinal direction. Furthermore, it exhibits shrinkage force in the width direction at the same time, so that finishing after being shrunk and attached as a label becomes bad.
- In the case of adopting a method of drawing in the longitudinal direction after drawing in the width direction, although it can exhibit shrinkage force in the longitudinal direction, it exhibits shrinkage force in the width direction at the same time, so that finishing after being shrunk and attached as a label becomes bad.

Furthermore, based on problems in the production of the foregoing conventional heat-shrinkable polyester film, the present inventors have studied further on consideration for obtaining a heat-shrinkable polyester film with good perforation-tear property and high productivity, and as a result, they have arrived at the following finding.

- In order for perforation-tear property as a label to be good, it is considered that molecules oriented in the longitudinal direction need to be left in some extent.
- In order for finishing after shrinkage-attachment as a label to be good, it is essential not to exhibit shrinkage force in the width direction, therefore it is considered that the state of tension of molecules oriented in the width direction need to be canceled out.
- It is considered that the shrinkage speed can be lowered by leaving the molecules oriented in the width direction since a change in molecular orientation in the longitudinal direction at the time of being allowed to shrink in the longitudinal direction becomes slow.
- It is considered that the followability can be improved by leaving the molecules oriented in the width direction since a reduction in shrinkage stress with time, which is generated at the time of being allowed to shrink in the longitudinal direction, is suppressed.

Based on the above-mentioned findings, the present inventors have found that in order to simultaneously satisfy achieving both satisfactory shrinkage finishing properties and followability and attaining the perforation opening property, it is necessary to allow "molecules not contributed to shrinkage force while being oriented in the width direction" to be present in a film and to allow the film to have an appropriate molecular orientation. Then, they have paid attention on how to carry out drawing in order for "molecules not contributed to shrinkage force while being oriented in the width direction" to be able to be present in a film and how to control it, and had a trial and error and. As a result, they have reached the present invention based on the following: drawing is carried out in the longitudinal direction after drawing is carried out in the width direction, what is called, in production of a film by a lengthwise-transverse drawing method, by conducting the following means, "molecules not contributed to shrinkage force while being oriented in the width direction" to be present in a film can be realized, thereby to obtain a heat-shrinkable polyester film satisfying aging resistance, good finishing properties after shrinkage, followability and perforation-tear property at the same time.

(1) Control of transverse drawing condition
(2) Intermediate heat treatment after transverse drawing
(3) Control of lengthwise drawing condition
(4) Heat treatment after lengthwise drawing Hereinafter, each of the procedures mentioned above will be sequentially described.

(1) Control of Transverse Drawing Condition

First, the film is drawn in the transverse direction (transverse drawing). The transverse drawing is carried out such that the ratio becomes 3.5 times or more and 5 times or less at Tg or more and Tg+20° C. or less, in a state that both edges in the width direction are held by clips in a tenter. When the draw ratio is lower than 3.5 times, it is not preferred because irregularity of thickness becomes easy to be generated and the productivity becomes poor. When the draw ratio is higher than 5 times, oriented crystallization of the film after transverse drawing progresses and it is not preferred because breakage is easily generated at a lengthwise drawing process. In this connection, before the transverse drawing, it is preferred that preheating be previously performed and it is good for preheating to be performed until the temperature of the film surface reaches a temperature not lower than Tg and not higher than Tg+30° C.

By drawing a film in the width direction at a temperature and a ratio mentioned above, the absorbancy ratio in the width direction of the film becomes not less than 0.45 and not more than 0.85.

After the transverse drawing, it is preferred that the film be passed through an intermediate zone where no positive heating operation is carried out. In the case where there is a difference in temperature between a transverse drawing zone and an intermediate heat treatment zone of the first tenter, heat (hot air itself or radiant heat) of the intermediate heat treatment zone streams into the transverse drawing zone and the temperature of the transverse drawing zone is not stabilized. Since this sometimes causes the film quality to become unstable, it is preferred that a film after transverse drawing and before an intermediate heat treatment be passed through an intermediate zone over a prescribed period of time and then the intermediate heat treatment be conducted. In this intermediate zone, when a strip of paper is hung down without passing a film, by shutting off an associated stream accompanied by the movement of the film and hot air from the transverse drawing zone and the intermediate heat treatment zone so as to allow the strip of paper to hang down almost completely in the vertical direction, a film with a stable quality is easily obtained. As the time required for passing the intermediate zone, a period of 1 to 5 seconds or so is sufficient. When the time is shorter than 1 second, the length of the intermediate zone becomes insufficient and the deficiency of a shutoff effect for heat is caused. Moreover, although it is preferred to make the time required for passing the intermediate zone longer, since the facilities become large when the time is too long, a period of 5 seconds or so is sufficient.

(2) Intermediate Heat Treatment after Lengthwise Drawing

In order for "molecules not contributed to shrinkage force while being oriented in the width direction" to be present in a film, it is preferable to thermally relax molecules oriented in the width direction, but conventionally, in biaxial drawing of a film, between the first-axial drawing and the second-axial drawing, when a film is subjected to heat treatment at high temperature, the film is crystallized after heat treatment, so that the film cannot be drawn more, this fact was the technical common knowledge in the art. However, the present inventors have had a trial and error, and as a result, a surprising fact has been found out as follows; in a transverse-lengthwise drawing method, transverse drawing is conducted in a certain constant condition, an intermediate heat treatment is conducted in a predetermined condition with adjusting to the state of the film after the transverse drawing, and furthermore, with adjusting to the state of the film after the intermediate heat treatment, lengthwise drawing is conducted in a predetermined condition, thereby without causing breakage in the lengthwise drawing, to be able to make "molecules not contributed to shrinkage force while being oriented in the width direction" present in the film.

That is, in the production of the film of the present invention by a transverse-lengthwise drawing method, after an undrawn film is transversely drawn, under a state that both edges in the width direction are held by clips in a tenter, it is necessary to conduct heat treatment (hereinafter called intermediate heat treatment) at a temperature of Tg+40° C. or more and Tg+70° C. or less. By performing such an intermediate heat treatment, it becomes possible to allow "molecules not contributed to shrinkage force while being oriented in the width direction" to be present in a film, from which it becomes possible to obtain a film in which the perforation opening property is satisfactory and no irregularity of shrinkage is generated when formed into a label. Even in the case where any transverse drawing is conducted, "molecules not contributed to shrinkage force while being oriented in the width direction" cannot be necessarily to be present in a film, but by conducting the foregoing predetermined transverse drawing, it becomes possible that "molecules not contributed to shrinkage force while being oriented in the width direction" can be present in a film for the first time after intermediate heat treatment. And then, by subjecting the film to prescribed lengthwise drawing described later, it becomes possible to orient molecules to the longitudinal direction and exhibit shrinkage force in the longitudinal direction while maintaining "molecules not contributed to shrinkage force while being oriented in the width direction" formed in the film.

The temperature of the intermediate heat treatment is more preferably not lower than Tg+43° C., further preferably not lower than Tg+46° C., more preferably not higher than Tg+67° C., and further preferably not higher than Tg+64° C. On the other hand, it is necessary that the treatment time for the intermediate heat treatment be appropriately adjusted within a range of not shorter than 5 seconds and not longer than 15 seconds depending on the composition of raw materials. In the intermediate heat treatment, the quantity of heat given to the film is of importance, and when the temperature of the intermediate heat treatment is low, an extended period of the intermediate heat treatment is required. However, since the facilities are made more gigantic when the treatment time for the intermediate heat treatment is too long, it is preferred to appropriately adjust the process by the modification of the temperature and the treatment time.

By setting the temperature of the intermediate heat treatment to be not lower than Tg+40° C., the degree of molecular orientation in the width direction increased to some extent can be maintained, and therefore, it is possible to maintain the tensile breaking strength in the width direction high while maintaining the right-angled tearing strength low. In contrast, by controlling the temperature of the intermediate heat treatment within a range of not higher than Tg+70° C., it is possible to suppress the crystallization of the film to maintain the drawability in the width direction and to suppress troubles caused by breakage. Moreover, it is possible to suppress the crystallization of the surface layer of the film to maintain the solvent adhesive strength high, and furthermore, it is also possible to reduce the irregularity of thickness in the width direction. In this way, uniaxially drawn film is obtained.

A relaxation may be conducted at the intermediate heat treatment, but when a relaxation rate is beyond 40%, the degree of molecular orientation becomes low, and the tensile breaking strength in the width direction becomes low, therefore, the relaxation ratio is preferably not larger than 40%.

With the intermediate heat treatment at above described temperature, in the width direction of a film as the orientation direction, the oriented molecular chains are restrained by heating and the crystallization progresses, and as a result thereof, the absorbancy ratio in the width direction of the film becomes not less than 0.55 and not more than 1.05. When the orientation in the width direction of a film before the film is subjected to the intermediate heat treatment is high, the absorbancy ratio in the width direction of the film after the intermediate heat treatment is also largely increased. Moreover, the higher the temperature of the intermediate heat treatment is, the more largely increased the absorbancy ratio in the width direction of the film is since the crystallization easily progresses. On the other hand, when the relaxation in the width direction described later is performed, the absorbancy ratio is decreased since the orientation in the width direction is lowered. In this way, by adjusting the intermediate heat treatment temperature and the relaxation rate (described later) in the width direction, the absorbancy ratio in the width direction of a film after the intermediate heat treatment can be adjusted. In this connection, with regard to the longitudinal direction of the film, since the film is undrawn at the stage of the intermediate heat treatment and is not molecularly oriented, the change in the absorbancy ratio in the longitudinal direction of the film is small at the stage of the intermediate heat treatment, and the film has a small absorbancy ratio of not more than 0.4.

(3) Control of Lengthwise Drawing Condition

For the purpose of allowing a film to exhibit the lengthwise shrinkage, lengthwise drawing has been used. In general, as the lengthwise shrinkage is heightened, the shrinkage stress in the lengthwise direction is also heightened. In order to allow the shrinkage stress in the lengthwise direction to be lowered, it is necessary to allow the drawing stress at the time of lengthwise drawing to be lowered. And then, as a means of allowing the lengthwise drawing stress to be lowered, although there is a method of lowering the lengthwise draw ratio, it is not preferred because when the lengthwise draw ratio is lowered, the shrinkage to be exhibited is also lowered due to the relationship of material balance.

As such, the present inventors have focused their attention on multi-stage drawing and high-temperature drawing as a method of allowing only the lengthwise drawing stress to be lowered while heightening the lengthwise draw ratio and maintaining the lengthwise shrinkage high. However, when the temperature of a preheating roll is elevated in order to perform high-temperature drawing, a film is stuck on the roll. In particular, since a large amount of amorphous raw material is used in the film of the present invention, it is not preferred because the film has an adhesive force and is easily stuck on the roll when preheated at a high temperature. As such, in the present invention, a method of allowing a film to be preheated to some extent by means of a preheating roll and then allowing the film to be heated in the air by means of a heating means (an infrared heater or the like) capable of heating a film without touching the film to be drawn is employed to perform high-temperature drawing. And then, by combining high-temperature drawing and multi-stage drawing, the lengthwise drawing stress and the shrinkage stress in the lengthwise direction have been successfully lowered.

With regard to the specific lengthwise drawing condition, it is preferred that a film after the intermediate heat treatment be introduced to a lengthwise drawing machine in which a plurality of rolls are continuously disposed, be preheated on a preheating roll until the film temperature reaches a temperature not lower than Tg and not higher than Tg+20° C., and then, heated by means of an infrared heater or the like so that the film temperature reaches a temperature not lower than Tg+20° C. and not higher than Tg+60° C. to subject the film to lengthwise drawing so that the total draw ratio becomes 2.2 to 4 times. As the lengthwise drawing roll, a heating roll may be used. In this context, it is preferred that the lengthwise drawing be performed in multi-stage drawing which is two or more-stage drawing, and it is preferred that drawing at the second stage be performed at a temperature higher than that in drawing at the first stage.

When the temperature in lengthwise drawing is lower than Tg+20° C., it is not preferred because the drawing stress at the time of lengthwise drawing becomes high, the shrinkage stress in the longitudinal direction becomes high, the trans conformation ratio becomes high and the shrinkage speed becomes fast. Moreover, the same holds true for the case in which single-stage drawing is employed for lengthwise drawing instead of multi-stage drawing which is two or more-stage drawing and also for the case of being drawn at a draw ratio higher than 4 times. The lengthwise drawing temperature is preferably not less than Tg+23° C. and further preferably not less than Tg+26° C. It is considered that the upper limit of the lengthwise drawing temperature is Tg+60° C. in order to prevent a film from adhering to a roll, or the like. Moreover, the lengthwise draw ratio is preferably not less than 2.4 times and not more than 3.8 times and is further preferably not less than 2.6 times and not more than 3.6 times in total.

Moreover, in the multi-stage drawing, it is preferred to perform drawing at the second or later stage at a temperature higher than that in drawing at the first stage and to make the draw ratio at the second or later stage higher than that at the first stage in order to allow the drawing stress to be lowered while making the shrinkage high.

By drawing a film in the longitudinal direction at a temperature and a ratio mentioned above, the absorbancy ratio in the longitudinal direction of the film is allowed to become not less than 0.53 and not more than 0.98. On the other hand, by drawing a film in the longitudinal direction, since some molecular chains which have been oriented in the width direction of the film are oriented in the longitudinal direction, the orientation in the width direction of the film is slightly lowered and the absorbancy ratio in the width direction of the film becomes not less than 0.5 and not more than 0.9.

(4) Heat Treatment after Lengthwise Drawing

It is necessary that the film after transverse drawing be finally subjected to a heat treatment over a period of not shorter than 5 seconds and not longer than 10 seconds at a temperature of not lower than Tg ° C. and not higher than Tg+40° C. in a state that both edges in the width direction are held by clips in a tenter. The relaxation (slackening) in the width direction may be arbitrarily conducted simultaneously with this heat treatment. In the case of performing a relaxation, the relaxation rate is preferably more than 0% and not more than 30%. When the relaxation rate in the width direction is more than 30%, it is not preferred because the trans conformation ratio in the width direction of the film becomes too low, and the right-angled tearing strength and the tensile breaking strength in the width direction are lowered. The relaxation rate in the width direction is more preferably not more than 27% and further preferably not more than 24%.

When the heat treatment temperature is higher than Tg+40° C., it is not preferred because the shrinkage in the longitudinal direction is lowered and the heat shrinkage in the longitudinal direction at 90° C. becomes less than 35%. Moreover, when the heat treatment temperature is lower than Tg, it is not preferred because the thermal relaxation of the molecular orientation in the longitudinal direction is not sufficiently performed, the degree of shrinkage in the longitudinal direction (the so-called natural shrinkage) is increased with the lapse of time at the time of allowing a final product to be stored under ordinary temperature condition. Moreover, although it is preferred that the heat treatment time be set as long as possible, the facilities are made more gigantic when the treatment time is too long, and therefore, it is preferred that the treatment time be set to not longer than 10 seconds.

In the longitudinal direction in which the molecular orientation is high, since molecular chains are slightly crystallized by heating in the above-mentioned final heat treatment process and the molecular orientation is restrained, the absorbancy ratio in the longitudinal direction of the film becomes not less than 0.55 and not more than 1.

The package of the present invention is a package in which a label provided with a perforation or a notch using the foregoing heat-shrinkable polyester film of the present invention is covered at least on a part of the outer periphery of an object to be packaged and then to shrink by heat. The object to be packaged can be exemplified by PET bottles for beverage, various kinds of bottles, cans, plastic containers for confectionary, a box lunch and the like, paper-made boxes, and the like. In general, in the case where a label using a heat-shrinkable polyester film is covered on the packaging object and heat-shrunk, the label is heat-shrunk by about 5 to 30% and closely attached on the package. Additionally, a label covered on a packaging object may be printed or may not be printed.

A method for producing a label is as follows; an organic solvent is applied on the inside slightly from the end part of one surface of a rectangular film, the film is immediately rounded to stack the end parts and bonded into a label-form, or an organic solvent is applied on the inside slightly from the end part of one surface of a film wound as a roll, the film is immediately rounded to stack the end parts and bonded into a tube-form, which is cut into a label. As the organic solvent for bonding, cyclic ethers such as 1,3-dioxolan and tetrahydrofuran are preferable. Besides, there can be used aromatic hydrocarbons such as benzene, toluene, xylene and trimethylbenzene; halogenated hydrocarbons such as methylene chloride and chloroform; phenols such as phenol, or a mixture thereof.

The present application claims the benefit of priority to Japan Patent Application Number 2013-123027 filed on Jun. 11, 2013. The entire contents of the specifications of Japan Patent Application Number 2013-123027 filed on Jun. 11, 2013 is hereby incorporated by reference.

EXAMPLES

Hereinafter, the present invention is described in more detail by Examples, but the present invention is by no means limited to aspects of the Examples, and it can be suitably modified in the range not departing from the scope of the present invention. Evaluation methods of films using in the present invention are as follows.

[Absorbancy Ratio]

Using an FT-IR spectrometer "FTS 60A/896" (manufactured by Varian Inc.), the infrared absorption spectrum of a heat-shrinkable film was measured by ATR method utilizing polarized light under the conditions of a measuring wave number region of 650 to 4000 $cm^{-1}$ and a cumulative number of 128 times. A ratio A1/A2 of an absorbancy A1 at 1340 $cm^{-1}$ to an absorbancy A2 at 1410 $cm^{-1}$ is defined as the absorbancy ratio.

[Heat Shrinkage (Hot-Water Shrinkage)]

A heat-shrinkable film was cut into a square of 10 cm×10 cm, treated and heat-shrunk in no load state for 10 seconds in hot water at a predetermined temperature ±0.5° C., and then the dimensions of the film in the lengthwise and transverse directions were measured, and heat shrinkage each was obtained according to the following Equation 1. The direction with the larger heat shrinkage was defined as a main shrinkage direction.

Heat shrinkage={(length before shrinkage−length after shrinkage)/length before shrinkage}×100 (%)   Equation 1

[Shrinkage Stress]

A sample of 200 mm in length in the main shrinkage direction and 20 mm in width was cut out of a heat-shrinkable film and measured for the shrinkage stress using a strength and elongation measuring machine with a heating furnace (TENSILON (a registered trademark of ORIENTEC Co., LTD)). The heating furnace was previously heated to 90° C., and the distance between chucks was set to 100 mm. The air blast blown into the heating furnace was once stopped, the door of the heating furnace was opened, the sample was fitted to the chucks, after which the door of the heating furnace was quickly closed and the air blast was restarted. The shrinkage stress was measured over a period of not shorter than 30 seconds, a shrinkage stress (MPa) at the end of 30 seconds was determined, and the maximum value obtained during the measurement was defined as the maximum shrinkage stress (MPa). Moreover, the ratio (percentage) of a shrinkage stress at the end of 30 seconds relative to the maximum shrinkage stress was defined as the stress ratio (%).

[Difference Between Shrinkages]

In the same manner as that for determining the heat shrinkage, a hot-water shrinkage in the main shrinkage direction at each of the temperatures of 90° C., 80° C. and 70° C. was measured. An absolute value $|\Delta_{90-80}-\Delta_{80-70}|$ of the difference between a difference $\Delta_{90-80}$ between a hot-water shrinkage at 90° C. and a hot-water shrinkage at 80° C. and a difference $\Delta_{80-70}$ between a hot-water shrinkage at 80° C. and a hot-water shrinkage at 70° C. was defined as the difference between shrinkages.

[Right-Angled Tearing Strength]

Figure 1:
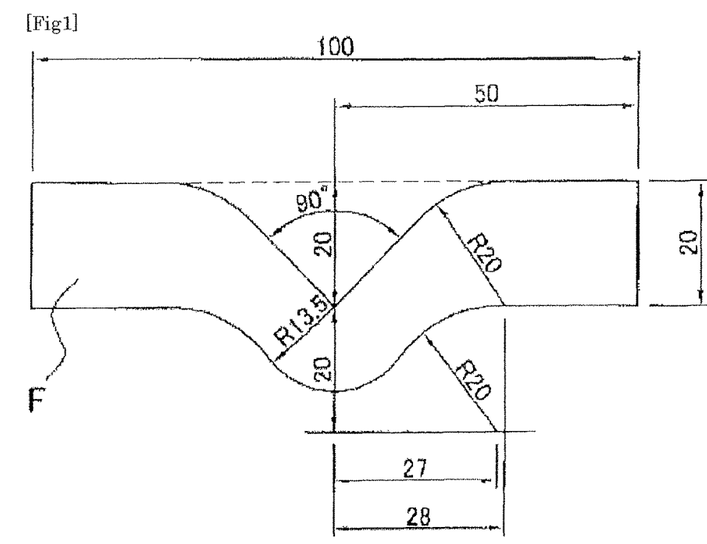
FIG. 1 is an explanatory illustration showing a shape of a test specimen for the measurement of the right-angled tearing strength (In this connection, the unit of the length of each portion of the test specimen in the Figure is mm, and R denotes the radius).

A film in a state of being previously slackened was mounted to a rectangular frame having a prescribed length (that is, both ends of the film were allowed to be grasped by the frame). Then, by immersing the film in hot water at 80° C. for about 5 seconds until the slackened film became a tensioned state within the frame (until the slack was eliminated), the film was allowed to shrink by 10% in the longitudinal direction. In accordance with JIS K7128-3, a test specimen with a shape shown in FIG. 1 was cut out of this film which had been allowed to shrink by 10%. In this connection, at the time of cutting out the test specimen, the width direction of the film was directed along the tearing direction. Next, both ends (in the longitudinal direction) of the test specimen was allowed to be grasped with a universal tensile testing machine ("Autograph" manufactured by SHIMADZU CORPORATION), the tensile test was performed under the condition of a tensile speed of 200 mm/minute, and a maximum load at the time of being completely torn apart in the longitudinal direction of the film was measured. By dividing the maximum load by the thickness of the film, a right-angled tearing strength per unit thickness (N/mm) was calculated.

[Tensile Breaking Strength]

A test specimen with a strip-like shape of 140 mm in the measurement direction (the width direction of the film) and 20 mm in the direction orthogonal to the measurement direction (the longitudinal direction of the film) was prepared. Using a universal tensile testing machine "DSS-100" (manufactured by SHIMADZU CORPORATION), each of 20 mm grasping margins located at both ends of the test specimen was fixed to a chuck (the distance between chucks of 100 mm), the tensile test was performed under the conditions of an atmospheric temperature of 23° C. and a tensile speed of 200 mm/minute, and the strength (stress) at the time of being torn and broken was defined as the tensile breaking strength.

[Tg (Glass Transition Temperature)]

Using a differential scanning calorimeter manufactured by Seiko Instruments Inc. (model: DSC220), 5 mg of an undrawn film was heated at a heating-up speed of 10° C./min from −40° C. to 120° C., Tg was obtained from the thus obtained endothermic curve. Tangent lines were drawn in front of and behind the inflection point of the endothermic curve, and the intersection was defined as Tg (° C.).

[Shrinkage Strain of Label]

A heat-shrinkable film was previously subjected to three-color printing with respective inks of grass green color, gold color and white color available from TOYO INK CO., LTD. By allowing both end parts of the film after printing to be overlapped and to be bonded together under a condition of 120° C. and 0.5 second with a heat sealer, a tube-like label (a tube-like label in which the peripheral direction is the main shrinking direction of a heat-shrinkable film and the outer peripheral length is 1.1 times the outer peripheral length of a bottle to which the label is mounted) was prepared. By attaching the tube-like label on a 500-ml PET bottle (62 mm in diameter of the body, 25 mm in minimum diameter of the neck part) and allowing the label to shrink by heat at a zone temperature of 80° C. with a passing time of 2.5 seconds using a steam tunnel (model type; SH-1500-L) available from Fuji Astec Inc., the label was mounted to the bottle. In this connection, at the time of attaching, in the neck part, a part with a diameter of 40 mm was adjusted so as to be positioned at one end of the label. For evaluating finishing properties after shrinkage, the strain in the direction of 360 degrees at the upper part of the mounted label was measured using a gauge and the maximum value of the strain was determined. The finishing properties were evaluated according to the following criteria.
Excellent: maximum strain less than 1.0 mm
Good: maximum strain not less than 1.0 mm and less than 2.0 mm
Poor: maximum strain not less than 2.0 mm
[Label Adhesiveness]
Under the same conditions as those for the shrinkage strain of the label mentioned above, a label was mounted to a PET bottle. The label adhesiveness was evaluated according to the following criteria.
Excellent: There is no slack between the mounted label and the PET bottle and the label does not move even when the cap portion of the bottle is fixed and the label is twisted.
Good: Although the label does not move even when the cap portion of the bottle is fixed and the label is twisted, there is a little slack between the label and the PET bottle.
Poor: The label is allowed to shift when the cap portion of the bottle is fixed and the label is twisted.
[Wrinkles of Label]
Under the same conditions as those for the shrinkage strain of the label mentioned above, a label was mounted to a PET bottle and the occurrence state of wrinkles was evaluated according to the following criteria.
Excellent: The number of wrinkles with a size of not less than 2 mm is zero.
Good: The number of wrinkles with a size of not less than 2 mm is not less than 1 and not more than 2.
Poor: The number of wrinkles with a size of not less than 2 mm is not less than 3.
[Peeling at Label Bonded Part]
Under the same conditions as those for the shrinkage strain of the label mentioned above, a label was mounted to a PET bottle. Being turned up or peeling in a bonded part of the label after shrinkage was visually evaluated according to the following criteria.
Good: There is no being turned up part or peeling part with a size of not less than 2 mm in a bonded part.
Poor: There is a being turned up part or peeling part with a size of not less than 2 mm in a bonded part.
[Perforation Opening Property]
A label to which perforations were previously provided in the direction orthogonal to the main shrinkage direction was attached on a PET bottle in the same condition as in the foregoing measuring condition of shrinkage strain. The perforation was formed by providing a hole of 1 mm long in the intervals of 1 mm, and two lines of perforations were provided in width 22 mm and length 120 mm in the lengthwise direction of the label (height direction). Thereafter, this bottle was filled with 500 ml of water, cooled at 5° C., and perforations of the label of the bottle immediately after taking it out from a refrigerator were torn with fingertips, and the number of bottles cleanly not torn along the perforations in the lengthwise direction thereby to be not able to remove the label from the bottle was counted, the total samples of 50 minus the above number of bottles, and a ratio (%) relative to the total samples of 50 was calculated as a perforation opening defective ratio.
<Preparation of Polyester Raw Material>

Synthetic Example 1

Into an autoclave made of stainless steel equipped with a stirrer, a thermometer and a partial reflux condenser, 100 mol % of dimethyl terephthalate (DMT) as a dicarboxylic acid component and 100 mol % of ethylene glycol (EG) as a glycol component were charged such that ethylene glycol became 2.2 times to dimethyl terephthalate in mole ratio, and using 0.05 mol % (relative to acid component) of zinc acetate as an ester exchange catalyst, and 0.225 mol % (relative to acid component) of antimony trioxide as a polycondensation catalyst, ester exchange reaction was conducted while distilling methanol generated out of the system. Thereafter, polycondensation reaction was carried out at 280° C. under a reduced pressure of 26.7 Pa. A polyester (A) of 0.75 dl/g in intrinsic viscosity was obtained. This polyester (A) is a polyethylene telephthalate.

Synthetic Example 2

In the same way as Synthetic Example 1, polyesters B to F shown in Table 1 were synthesized. In the Table, BD is 1,4-butanediol, NPG is neopentyl glycol, CHDM is 1,4-cyclohexanedimethanol, DEG is diethylene glycol making a byproduct, and ε-CL is ε-caprolactone. In the production of polyester F, $SiO_2$ (Silysia 266 manufactured by Fuji Silysia Chemical, Ltd.) was added as a lubricant at a proportion of 7,000 ppm relative to the polyester. Regarding the intrinsic viscosity of each polyester, B was 0.72 dl/g, C was 0.80 dl/g, D was 1.20 dl/g, E was 0.77 dl/g, and F was 0.75 dl/g. Each polyester was suitably made into chips.

Mixture compositions of polyester resins used in Examples and Comparative Examples, compositions of films obtained in Examples and Comparative Examples, and production conditions of films in Examples and Comparative Examples are shown in Tables 1 and 2.

TABLE 1

| Polyester raw material | Dicarboxylic acid | Polyhydric alcohol component | | | | | Ester component | Added mount of lubricant |
|---|---|---|---|---|---|---|---|---|
| | DMT | EG | BD | NPG | CHDM | DEG | ε-CL | (ppm) |
| A | 100 | 99 | — | — | — | 1 | — | — |
| B | 100 | 68 | — | 30 | — | 2 | — | — |
| C | 100 | 67 | — | — | 30 | 3 | — | — |
| D | 100 | — | 100 | — | — | — | — | — |

TABLE 1-continued

| Polyester raw material | Raw material composition of polyester (mol %) | | | | | | | Added mount of lubricant (ppm) |
|---|---|---|---|---|---|---|---|---|
| | Dicarboxylic acid | Polyhydric alcohol component | | | | | Ester component | |
| | DMT | EG | BD | NPG | CHDM | DEG | ε-CL | |
| E | 100 | — | 55 | — | — | — | 45 | — |
| F | 100 | 100 | — | — | — | 1 | — | 7000 |

TABLE 2

| | Raw material ratio (mass %) | Amount of amorphous component monomer (mol %) | Drawing condition Transverse drawing | | | |
|---|---|---|---|---|---|---|
| | | | Drawing | | Relaxation rate (%) | Temperature of intermediate heat treatment zone (° C.) |
| | | | Temperature (° C.) | Ratio | | |
| Example 1 | A/B/D/F = 25/60/10/5 | 18 | 70 | 4 | 0 | 115 |
| Example 2 | A/C/D/F = 25/60/10/5 | 18 | 70 | 4 | 0 | 115 |
| Example 3 | A/B/E/F = 25/60/10/5 | 18 | 70 | 4 | 0 | 115 |
| Example 4 | A/B/D/F = 25/60/10/5 | 18 | 70 | 4 | 10 | 115 |
| Example 5 | A/B/D/F = 10/75/10/5 | 22.5 | 70 | 4 | 10 | 115 |
| Example 6 | A/B/D/F = 10/60/25/5 | 18 | 70 | 4 | 10 | 115 |
| Comparative Example 1 | B/F = 90/10 | 27 | 75 | 4 | 0 | 130 |
| Comparative Example 2 | A/B/D/F = 25/60/10/5 | 18 | 70 | 4 | 0 | 115 |
| Comparative Example 3 | A/B/D/F = 25/60/10/5 | 18 | 70 | 4 | 45 | 115 |
| Comparative Example 4 | A/B/D/F = 25/60/10/5 | 18 | No transverse drawing | | | |

| | Drawing condition | | | | | | | |
|---|---|---|---|---|---|---|---|---|
| | Lengthwise drawing | | | | | | Final heat treatment | |
| | Preheat | First stage | | Second stage | | Total | | |
| | temperature (° C.) | Temperature (° C.) | Ratio | Temperature (° C.) | Ratio | drawing ratio | Temperature (° C.) | Relaxation rate (%) |
| Example 1 | 80 | 90 | 1.5 | 95 | 2 | 3 | 95 | 10 |
| Example 2 | 80 | 90 | 1.5 | 95 | 2 | 3 | 95 | 10 |
| Example 3 | 80 | 90 | 1.5 | 95 | 2 | 3 | 98 | 10 |
| Example 4 | 80 | 90 | 1.5 | 95 | 2 | 3 | 98 | 0 |
| Example 5 | 80 | 90 | 1.5 | 95 | 2 | 3 | 98 | 0 |
| Example 6 | 80 | 90 | 1.5 | 95 | 2 | 3 | 100 | 0 |
| Comparative Example 1 | 95 | 95 | 3 | No second stage | No second stage | 3 | 95 | 0 |
| Comparative Example 2 | 80 | 80 | 3 | No second stage | No second stage | 3 | 95 | 10 |
| Comparative Example 3 | 80 | 90 | 1.5 | 95 | 2 | 3 | 95 | 0 |
| Comparative Example 4 | 80 | 80 | 1.5 | 95 | 2 | 3 | 95 | 0 |

Example 1

The above-described polyester A, polyester B, polyester D and polyester F were mixed by 25:60:10:5 in mass ratio, and charged into an extruder. Thereafter, the mixed resin was melted at 280° C. and extruded from a T-die, and quenched by winding it on a rotating metal roll set at a surface temperature of 30° C. An undrawn film of 324 μm thickness was obtained. At this time, the take-over speed of the undrawn film (rotating speed of the metal roll) was about 20 m/min. Moreover, Tg of the undrawn film was 67° C.

The obtained undrawn film was introduced to a tenter (first tenter) to which a transverse drawing zone, an intermediate zone and an intermediate heat treatment zone are continuously provided. In this connection, in the intermediate zone, when a strip of paper was hung down without passing a film, hot air from the drawing zone and hot air from the heat treatment zone were shut off so as to allow the strip of paper to hang down almost completely in the vertical direction.

And then, the undrawn film introduced to the tenter was preheated until the film temperature reached 80° C., after which the film was drawn by 4 times in the transverse direction at 70° C. in the transverse drawing zone. The film was passed through the intermediate zone (passing time=about 1.2 seconds) to be introduced to the intermediate heat treatment zone, and the film was heat-treated over a period of 8 seconds at 115° C. to obtain a transversely uniaxially drawn film with a thickness of 81 pin.

Furthermore, the transversely drawn film was introduced to a lengthwise drawing machine in which a plurality of rolls were continuously disposed, and the film was preheated on a preheat roll until the film temperature reached 80° C. Then, the temperature of the film was elevated by means of an infrared heater until the film temperature reached 90° C. to be drawn by 1.5 times, after which the temperature of the film was elevated again by means of an infrared heater until the film temperature reached 95° C. to be lengthwisely drawn by 2 times (3 times in total). Afterward, the lengthwisely drawn film was forcibly cooled by means of a cooling roll in which the surface temperature was set to 25° C.

Figure 2:
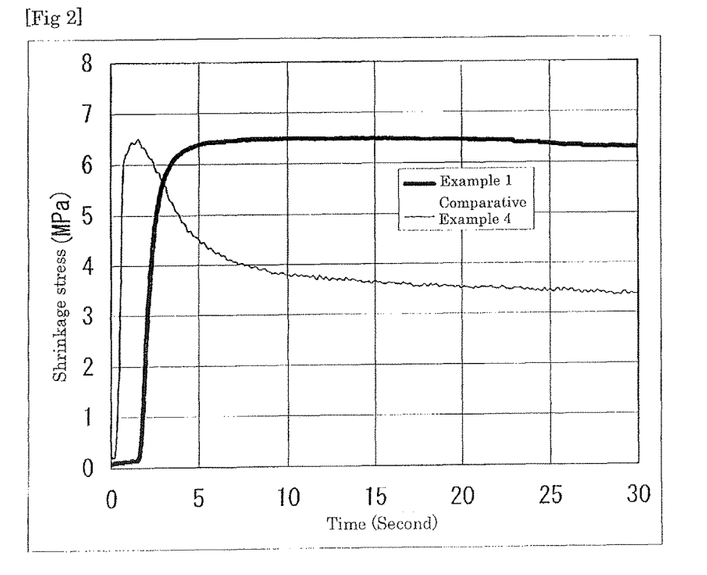
FIG. 2 shows shrinkage stress curves of the films in Example 1 and Comparative Example 4.

The film after cooling was introduced to a tenter (second tenter) and heat-treated over a period of 10 seconds under an atmosphere of 95° C. in the second tenter. Simultaneously, the film was subjected to 10% relaxation in the width direction. Afterward, the film was cooled, both edge parts thereof were cut away, and the film of 500 mm in width was wound into a roll to continuously produce a biaxially drawn film with a thickness of 30 μm of a prescribed length. The obtained film was evaluated for various properties in the above-mentioned manner. The evaluation results are shown in Table 3. The film was satisfactory in cutting property and shrinkage finish properties. Moreover, the shrinkage stress curve was shown in FIG. 2.

Example 2

A roll of a biaxially drawn film with a thickness of 30 μm was obtained in the same manner as that in Example 1 except that the polyester B was changed to polyester C. Tg of the undrawn film was 67° C. The evaluation results are shown in Table 3. The film was an excellent film as in the case of Example 1.

Example 3

A roll of a biaxially drawn film with a thickness of 30 μm was obtained in the same manner as that in Example 1 except that the polyester D was changed to polyester C and the final heat treatment temperature was changed to 98° C. The film was an excellent film as in the case of Example 1.

Example 4

A roll of a biaxially drawn film with a thickness of 30 μm was obtained in the same manner as that in Example 1 except that the relaxation in the width direction which had been performed in the final heat treatment process in Example 1 was performed in an intermediate heat treatment process, and in addition, the final heat treatment temperature was changed to 98° C. The evaluation results are shown in Table 3. The film was an excellent film as in the case of Example 1.

Example 5

A roll of a biaxially drawn film with a thickness of 30 μm was obtained in the same manner as that in Example 4 except that the ratio of polyester A and polyester B in Example 4 was changed so as to change the amount of the monomer for the amorphous component. The evaluation results are shown in Table 3. The film was an excellent film as in the case of Example 4.

Example 6

A roll of a biaxially drawn film with a thickness of 30 μm was obtained in the same manner as that in Example 4 except that the amount of polyester A and polyester D in Example 4, and in addition, the final heat treatment temperature was changed to 100° C. The evaluation results are shown in Table 3. The film was an excellent film as in the case of Example 4.

Comparative Example 1

The polyester B and polyester F were mixed by 90:10 in mass ratio, and charged into an extruder. Thereafter, the mixed resin was melted at 280° C. and extruded from a T-die, and quenched by winding it on a rotating metal roll set at a surface temperature of 30° C. An undrawn film of 360 thickness was obtained. At this time, the take-over speed of the undrawn film (rotating speed of the metal roll) was about 20 m/min. Moreover, Tg of the undrawn film was 67° C.

The obtained undrawn film was introduced to a tenter (first tenter) to which a transverse drawing zone, an intermediate zone and an intermediate heat treatment zone are continuously provided. In this connection, in this first tenter, the length of the intermediate zone positioned between the transverse drawing zone and the intermediate heat treatment zone was set to about 40 cm. In the intermediate zone, when a strip of paper was hung down without passing a film, hot air from the drawing zone and hot air from the heat treatment zone were shut off so as to allow the strip of paper to hang down almost completely in the vertical direction.

And then, the undrawn film introduced to the tenter was preheated until the film temperature reached 90° C., after which the film was drawn by 4 times in the transverse direction at 75° C. in the transverse drawing zone. The film was passed through the intermediate zone (passing time=about 1.2 seconds) to be introduced to the intermediate heat treatment zone, and the film was heat-treated over a period of 2 seconds at 130° C. to obtain a transversely uniaxially drawn film with a thickness of 90 μm.

Furthermore, the transversely drawn film was introduced to a lengthwise drawing machine in which a plurality of rolls were continuously disposed, and the film was preheated on a preheat roll until the film temperature reached 95° C., after which the film was interposed between lengthwise drawing rolls in which the surface temperature was set to 95° C. to be drawn by 3 times. Afterward, the lengthwisely drawn film was forcibly cooled by means of a cooling roll in which the surface temperature was set to 25° C.

The film after cooling was introduced to a tenter (second tenter) and heat-treated over a period of 2 seconds under an atmosphere of 95° C. in the second tenter. Afterward, the film was cooled, both edge parts thereof were cut away, and the film of 500 mm in width was wound into a roll to continuously produce a biaxially drawn film with a thickness of 30 μm of a prescribed length. The obtained film was evaluated for various properties in the above-mentioned manner. The evaluation results are shown in Table 3. The film had a high absorbancy ratio in the longitudinal direction, also had a high heat shrinkage stress and was a film in which peeling occurs easily in a bonded parts of a label at the time of shrinkage.

Comparative Example 2

A roll of a biaxially drawn film with a thickness of 30 μm was obtained in the same manner as that in Example 1 except that the infrared heater was not used in the lengthwise drawing process (the temperature is not elevated to 90° C.) and the two-stage drawing was changed to single-stage drawing. The evaluation results are shown in Table 3. As compared with the film in Example 1, the film had a high absorbancy ratio in the longitudinal direction, the difference between shrinkages became large and the shrinkage stress became high. Moreover, with regard to the shrinkage strain of a label after shrinkage, wrinkles, properties for being turned up and peeling in a bonded parts, the film was a film inferior to that in Example 1.

Comparative Example 3

A roll of a biaxially drawn film with a thickness of 30 vim was obtained in the same manner as that in Example 1 except that the thickness of the undrawn film was set to 198 μm and 45% relaxation was performed in an intermediate heat treatment process after transverse drawing instead of the final heat treatment process. The evaluation results are shown in Table 3. As compared with the film in Example 1, the film had a low absorbancy ratio in the width direction, and the right-angled tearing strength and the tensile breaking strength in the width direction were inferior to those in Example 1. With regard to the perforation opening defect ratio after shrinkage, the film was a film inferior to that in Example 1.

Comparative Example 4

A roll of a biaxially drawn film with a thickness of 30 μm was obtained in the same manner as that in Example 1 except that the thickness of the undrawn film was set to 90 vim, transverse drawing was not performed, and the film temperature in the first-stage and the second-stage at the lengthwise drawing was changed to 80° C. The evaluation results are shown in Table 3. As compared with the film in Example 1, the film had a low absorbancy ratio in the width direction, and the right-angled tearing strength and the tensile breaking strength in the width direction were inferior to those in Example 1. With regard to the perforation opening defect ratio after shrinkage, the film was a film inferior to that in Examples. Moreover, with the difference between shrinkages became large and with regard to the shrinkage strain of a label after shrinkage and wrinkles, the film was a film inferior to that in Example 1. The shrinkage stress curve of comparative example 4 was shown in FIG. 2.

TABLE 3

| | Thickness (μm) | Absorbancy ratio | | Hot-water shrinkage (%) | | | | | | Difference between shrinkages (%) | Shinkage stress in the longitudinal direction (MPa) | |
| | | | | 90° C. | | 70° C. | | 80° C. | | | | |
| | | Longitudinal direction | Width direction | Longitudinal direction | Width direction | Longitudinal direction | Width direction | Longitudinal direction | Width direction | | Maximum stress | After 30 second stress |
| --- | --- | --- | --- | --- | --- | --- | --- | --- | --- | --- | --- | --- |
| Example 1 | 30 | 0.85 | 0.8 | 50 | 5 | 15 | 33 | | | 1 | 6.5 | 6.3 |
| Example 2 | 30 | 0.83 | 0.77 | 51 | 3 | 16 | 34 | | | 1 | 6.1 | 5.5 |
| Example 3 | 30 | 0.78 | 0.71 | 45 | 1 | 18 | 33 | | | 3 | 4.8 | 4.6 |
| Example 4 | 30 | 0.8 | 0.72 | 43 | 3 | 12 | 28 | | | 1 | 5.5 | 5.1 |
| Example 5 | 30 | 0.95 | 0.83 | 56 | 5 | 15 | 33 | | | 5 | 6.8 | 6 |
| Example 6 | 30 | 0.71 | 0.68 | 40 | 1 | 10 | 26 | | | 2 | 4.8 | 4.7 |
| Comparative Example 1 | 30 | 1.04 | 0.9 | 58 | 3 | 15 | 35 | | | 3 | 7.8 | 7.5 |
| Comparative Example 2 | 30 | 1.03 | 0.78 | 48 | 6 | 19 | 38 | | | 9 | 12.5 | 11.5 |
| Comparative Example 3 | 30 | 0.8 | 0.45 | 55 | −2 | 14 | 35 | | | 1 | 4.8 | 4 |
| Comparative Example 4 | 30 | 0.75 | 0.31 | 55 | −5 | 20 | 43 | | | 11 | 6.5 | 3.3 |

| | Stress ratio (%) | Right-angled tearing strength (N/mm) | Tensile breaking strength (MPa) Width direction | Label adhesivness | Shrinkage strain of label | Wrinkels of label | Being turned up and peeling at label bonded part | Perforation opening defective ratio (%) |
| --- | --- | --- | --- | --- | --- | --- | --- | --- |
| Example 1 | 97 | 250 | 170 | Excellent | Excellent | Excellent | Good | 12 |
| Example 2 | 90 | 260 | 165 | Excellent | Excellent | Excellent | Good | 13 |
| Example 3 | 96 | 280 | 150 | Excellent | Excellent | Good | Good | 14 |
| Example 4 | 93 | 270 | 155 | Excellent | Excellent | Excellent | Good | 12 |
| Example 5 | 88 | 230 | 180 | Excellent | Good | Good | Good | 8 |
| Example 6 | 98 | 300 | 140 | Excellent | Excellent | Excellent | Good | 14 |
| Comparative Example 1 | 96 | 230 | 200 | Excellent | Excellent | Good | Poor | 6 |
| Comparative Example 2 | 92 | 260 | 165 | Excellent | Poor | Poor | Poor | 12 |
| Comparative Example 3 | 83 | 330 | 80 | Excellent | Excellent | Excellent | Good | 26 |
| Comparative Example 4 | 51 | 420 | 50 | Good | Poor | Poor | Good | 54 |

INDUSTRIAL APPLICABILITY

The heat-shrinkable polyester film according to the present invention is excellent in shrinkage finish properties and film strength. Moreover, since the film has a low shrinkage stress, it is possible to suppress a bonded part of a label after shrinkage from being turned up or peeling. Thus, the film can be suitably used in a label application for a bottle or the like. The packaged product such as a bottle obtained by using the heat-shrinkable polyester film according to the present invention as a label has a beautiful appearance.

EXPLANATION OF REFERENCE NUMERAL

F: Film

The invention claimed is:

1. A heat-shrinkable polyester film in which the main shrinking direction is the longitudinal direction,
wherein
a ratio A1/A2 (absorbancy ratio) of an absorbancy A1 of the film at 1340 cm$^{-1}$ obtained when measured by a polarized ATR-FTIR method to an absorbancy A2 thereof at 1410 cm$^{-1}$ obtained when measured by a polarized ATR-FTIR method is not less than 0.55 and not more than 1 in the longitudinal direction which is the main shrinking direction of the film while the ratio A1/A2 is not less than 0.5 and not more than 0.9 in the width direction orthogonal to the main shrinking direction, and
the hot-water shrinkage obtained by dipping in hot water of 90° C. for 10 seconds is not less than 35% and not more than 60% in the longitudinal direction of the film while the hot-water shrinkage is not less than −3% and not more than 12% in the width direction thereof.

2. The heat-shrinkable polyester film according to claim 1, wherein the maximum shrinkage stress in the main shrinking direction of the film determined when measured with hot air at 90° C. is not less than 3 MPa and less than 7 MPa, and the shrinkage stress at the end of 30 seconds after the initiation of measurement is not less than 70% and not more than 100% of the maximum shrinkage stress.

3. The heat-shrinkable polyester film according to claim 2, wherein the absolute value $|\Delta_{90-80}-\Delta_{80-70}|$ of the difference between a difference $\Delta_{90-80}$ between a hot-water shrinkage at 90° C. and a hot-water shrinkage at 80° C. and a difference $\Delta_{80-70}$ between a hot-water shrinkage at 80° C. and a hot-water shrinkage at 70° C. is not more than 5% when the film is dipped in hot water at each of the temperatures of 90° C., 80° C. and 70° C. for 10 seconds and the hot-water shrinkage in the longitudinal direction is measured.

4. The heat-shrinkable polyester film according to claim 3, wherein the tensile breaking strength in the width direction of the film is not less than 90 MPa and not more than 220 MPa.

5. The heat-shrinkable polyester film according to claim 4, wherein the right-angled tearing strength per unit thickness in the width direction determined after shrunk by 10% in the longitudinal direction in hot water at 80° C. is not less than 150 N/mm and not more than 300 N/mm.

6. The heat-shrinkable polyester film according to claim 5, wherein a main component of a monomer capable of forming an amorphous component in the whole polyester resin component of the polyester film is composed neopentyl glycol, 1,4-cyclohexanedimethanol or isophthalic acid.

7. A package comprising:
a label prepared from a heat-shrinkable polyester film according to claim 6 and provided with a perforation or a notch,
wherein the label is formed by being allowed to cover at least a part of the outer periphery of an object to be packaged and then to shrink by heat.

8. The heat-shrinkable polyester film according to claim 1, wherein the absolute value $|\Delta_{90-80}-\Delta_{80-70}|$ of the difference between a difference $\Delta_{90-80}$ between a hot-water shrinkage at 90° C. and a hot-water shrinkage at 80° C. and a difference $\Delta_{80-70}$ between a hot-water shrinkage at 80° C. and a hot-water shrinkage at 70° C. is not more than 5% when the film is dipped in hot water at each of the temperatures of 90° C., 80° C. and 70° C. for 10 seconds and the hot-water shrinkage in the longitudinal direction is measured.

9. The heat-shrinkable polyester film according to claim 1, wherein the tensile breaking strength in the width direction of the film is not less than 90 MPa and not more than 220 MPa.

10. The heat-shrinkable polyester film according to claim 1, wherein the right-angled tearing strength per unit thickness in the width direction determined after shrunk by 10% in the longitudinal direction in hot water at 80° C. is not less than 150 N/mm and not more than 300 N/mm.

11. The heat-shrinkable polyester film according to claim 1, wherein a main component of a monomer capable of forming an amorphous component in the whole polyester resin component is composed neopentyl glycol, 1,4-cyclohexanedimethanol or isophthalic acid.

12. A package comprising:
a label prepared from a heat-shrinkable polyester film according to claim 1 and provided with a perforation or a notch,
wherein the label is formed by being allowed to cover at least a part of the outer periphery of an object to be packaged and then to shrink by heat.

* * * * *